United States Patent
Svensson et al.

(10) Patent No.: US 11,619,514 B2
(45) Date of Patent: Apr. 4, 2023

(54) METHOD FOR PROVIDING A DIGITAL LOCALIZATION MAP

(71) Applicant: Robert Bosch GmbH, Stuttgart (DE)

(72) Inventors: Anke Svensson, Braunschweig (DE); Martin Lambertsen, Schellerten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 165 days.

(21) Appl. No.: 17/120,694

(22) Filed: Dec. 14, 2020

(65) Prior Publication Data
US 2021/0190534 A1 Jun. 24, 2021

(30) Foreign Application Priority Data
Dec. 23, 2019 (DE) .......................... 102019220510.0

(51) Int. Cl.
G01C 21/00 (2006.01)
(52) U.S. Cl.
CPC ..... G01C 21/3815 (2020.08); G01C 21/3885 (2020.08)
(58) Field of Classification Search
CPC ....................... G01C 21/3815; G01C 21/3885
See application file for complete search history.

(56) References Cited

U.S. PATENT DOCUMENTS

| | | | | |
|---|---|---|---|---|
| 2008/0071466 A1* | 3/2008 | Downs | .................. | G08G 1/0104 701/117 |
| 2012/0065873 A1* | 3/2012 | Van de Velde | ........ | G08G 1/052 701/119 |
| 2013/0131978 A1* | 5/2013 | Han | .................... | G01C 21/3638 701/436 |
| 2013/0282272 A1* | 10/2013 | Kluge | ................ | G01C 21/3469 701/425 |
| 2013/0328937 A1* | 12/2013 | Pirwani | .................. | G09G 5/373 345/660 |

(Continued)

FOREIGN PATENT DOCUMENTS

| | | |
|---|---|---|
| DE | 102013018315 A1 | 4/2015 |
| DE | 102016212734 A1 | 1/2018 |

(Continued)

OTHER PUBLICATIONS

Ni, Kai, et al., "Tectonic Sam: Exact, Out-of-Core, Submap-Based Slam," Proceedings 2007 IEEE International Conference on Robotics and Automation, 2007, pp. 1-8. https://www.cc.gatech.edu/~dellaert/pub/NI07icra.pdf Downloaded Dec. 9, 2020.

*Primary Examiner* — Frederick M Brushaber
*Assistant Examiner* — Harrison Heflin
(74) *Attorney, Agent, or Firm* — Norton Rose Fulbright US LLP; Gerard Messina

(57) ABSTRACT

A method for providing a digital localization map. The method includes: determining road sections by evaluating data of a road network to be mapped; classifying the road sections, taking defined conditions of the road network into account; classifying the road sections, taking driving-environment sensor data into account; combining the road sections to form clusters, taking the classifications into account; joint computational processing of each of the clusters; and transmitting the digital localization map created to a vehicle.

8 Claims, 2 Drawing Sheets

(56) References Cited

U.S. PATENT DOCUMENTS

| | | | | |
|---|---|---|---|---|
| 2014/0218593 A1* | 8/2014 | Yamada | ............ | H04N 5/232127 |
| | | | | 348/349 |
| 2015/0153187 A1* | 6/2015 | Dong | ..................... | G01C 21/30 |
| | | | | 701/446 |
| 2016/0102987 A1* | 4/2016 | Ding | ....................... | G01C 21/32 |
| | | | | 701/532 |
| 2016/0275786 A1* | 9/2016 | Fowe | ................... | G08G 1/0125 |
| 2019/0204092 A1* | 7/2019 | Wheeler | .............. | G01C 21/165 |
| 2020/0065842 A1* | 2/2020 | Viswanathan | ......... | G06Q 50/30 |
| 2020/0200543 A1* | 6/2020 | Mubarek | ............ | G01C 21/3815 |
| 2020/0385014 A1* | 12/2020 | Hanniel | .............. | B60W 60/001 |
| 2021/0055119 A1* | 2/2021 | Wiesenberg | .......... | B60W 40/06 |
| 2021/0354725 A1* | 11/2021 | King | .................... | B60W 40/06 |

FOREIGN PATENT DOCUMENTS

| | | |
|---|---|---|
| DE | 102019104716 A1 | 8/2019 |
| EP | 3293489 A1 | 3/2018 |
| WO | 2018126228 A1 | 7/2018 |

\* cited by examiner

METHOD FOR PROVIDING A DIGITAL LOCALIZATION MAP

CROSS REFERENCE

The present application claims the benefit under 35 U.S.C. § 119 of German Patent Application No. DE 102019220510.0 filed on Dec. 23, 2019, which is expressly incorporated herein by reference in its entirety.

FIELD

The present invention relates to a method and a device for providing a digital localization map for a vehicle. The present invention also relates to a computer program. In addition, the present invention relates to a machine-readable storage medium.

BACKGROUND INFORMATION

European Patent Application No. EP 3 293 489 A1 describes a method and a device for providing trajectory bundles for a map data analysis. It proposes an approach for generating trajectory bundles for map data analysis. The approach involves the receiving of data associated with the bounded geographic area. The data is collected from sensors of a plurality of devices traveling in the bounded geographic area, and includes checkpoints that indicate a position, a heading, a speed, a time or a combination thereof.

PCT Application No. WO 2018/126228 A1 describes a method for generating signs and lanes for high-resolution maps for autonomous vehicles.

Localization systems with feature-based, digital localization maps to determine vehicle position and orientation are central system components of automated driving functions.

A grid-based approach or an approach based on road sections are familiar for creating a digital localization map. In the case of the grid-based approach (approach A), the mapping area is subdivided into uniform rectangles, the data within each rectangle constituting a partition, also known as a spatial cluster. This data is then processed independently of data outside of the rectangle.

Another conventional approach (approach B) involves grouping the data which is recorded along the traffic lanes for the purpose of map production. In this case, a partition is an assemblage of successive road sections.

Both conventional approaches A and B allow mapping on a large scale. While the grids in the case of approach A are able to be calculated quickly and with little expenditure, the partitions are not considered for the map density. In creating maps for a larger area (e.g., an entire country), partitions with a great deal of data (e.g., large cities) and partitions with very little data (e.g., rural regions) may exist, which can make a map production process problematic.

A scalability of processes is described in, for example: "Tectonic SAM: Exact, Out-of-Core, Submap-Based SLAM", Proceedings 2007 IEEE International Conference on Robotics and Automation, 2007.

Various methods for local clustering are also available.

SUMMARY

An object of the present invention is to make available an improved method for providing a digital localization map for a vehicle.

According to a first aspect of the present invention, the objective may be achieved with a method for providing a digital localization map. In accordance with an example embodiment of the present invention, the method includes the steps:

a) Determining road sections by evaluating data of a road network to be mapped;
b) Classifying the road sections, taking defined conditions of the road network into account;
c) Classifying the road sections, taking driving-environment sensor data into account;
d) Combining the road sections to form clusters, taking the classifications carried out in steps b) and c) into account;
e) Joint computational processing of each of the clusters; and
f) Transmitting the digital localization map created to a vehicle.

It is advantageous that because data is processed together, a highly accurate digital localization map is able to be provided. Computing power for creating the digital localization map may thus advantageously be very well scaled or parallelized.

According to a second aspect of the present invention, the objective may be achieved with a device that is equipped to carry out the example method for providing a digital localization map, in accordance with example embodiments of the present invention.

According to a third aspect of the present invention, the objective may be achieved with a computer program including commands which, upon execution of the computer program by a computer, cause it to carry out the method in accordance with example embodiments of the present invention.

According to a fourth aspect of the present invention, the objective may be achieved with a machine-readable storage medium, on which the computer program is stored.

Advantageous further developments of the method in accordance with the present invention are described herein.

One advantageous further development of the method provides that in step d), a road section is assigned to a cluster. A defined allocation of road sections to clusters is thus carried out, so that parallel processing of road sections advantageously does not occur. This beneficially fosters high systematization in creating the digital localization map.

Another advantageous further development of the method provides that in step d), the clusters are aggregated with the road sections. In doing so, starting from starting points, the clusters are aggregated until they have a defined quantity of data. Good scalability in creating the digital localization map is thus advantageously promoted.

According to another advantageous further development of the method, in step d), the clusters are made as equal as possible in terms of the amount of data. Good parallelization for the computational processing of the clusters may thereby be realized.

Another advantageous further development of the method provides that in step d), upon reaching a defined size, a cluster is no longer further aggregated with road sections. As a consequence, computing power for processing the individual clusters is able to be apportioned very well among the computers available.

One advantageous further development of the method provides that in step d), similar road sections are combined to form clusters. Thus, for example, objects of the road-traffic infrastructure such as all tunnels, all roads with/without crossroad, etc., may be combined, which advantageously simplifies processing of the digital map.

According to another advantageous further development of the method, defined numerical values are assigned to the road sections in steps b) and c). This beneficially promotes easy classification of the road sections.

Another advantageous further development of the method provides that a volume of data of one or more clusters is adapted to a computing power of a map-production device. This advantageously fosters good scalability of the computers for creating the digital localization map.

According to another advantageous further development of the method, features that are defined for defined road sections for the digital localization map and that were ascertained during the classifying of the road sections in steps b) and c), are usable in the vehicle. This advantageously supports the provision of map qualities whose level of quality varies regionally, so that, for example, fully autonomous driving by use of the digital localization map is not possible in defined regions because of reduced quality.

Further measures improving the present invention are presented in greater detail below together with the description of the preferred exemplary embodiments of the present invention on the basis of figures.

DETAILED DESCRIPTION OF EXAMPLE EMBODIMENTS

Figure 1:
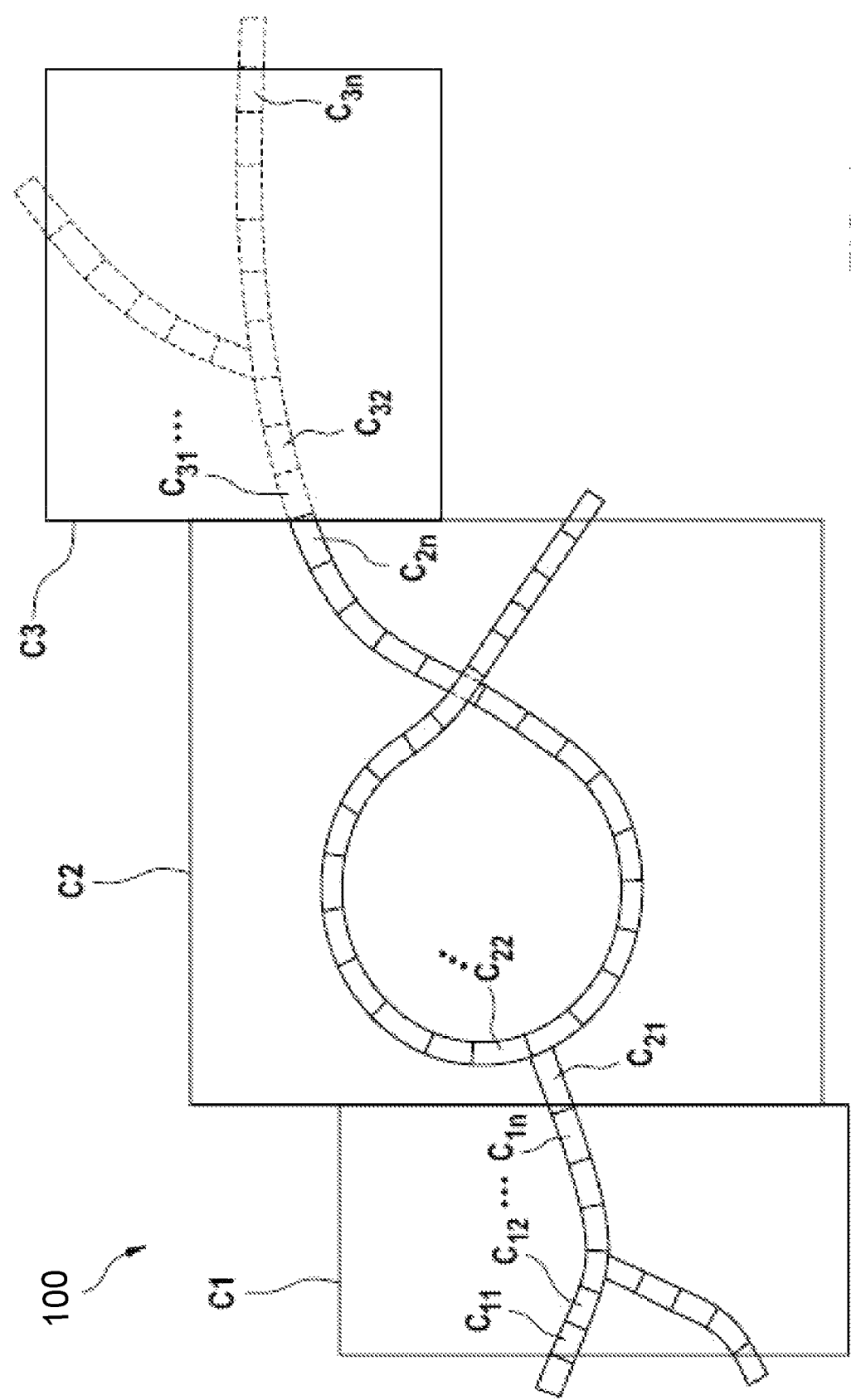
FIG. 1 shows an overview representation with an explanation of the operating principle of the method according to an example embodiment of the present invention.

FIG. 1 shows a basic overview sketch with an explanation of an operating principle of the proposed method in accordance with an example embodiment of the present invention. A road network 100 is shown, having a number of small road sections $C_{1n} \ldots C_{nn}$ (i.e, chunks) from whose data a digital localization map is to be created. It is also seen that these road sections are combined to form so-called clusters C1 ... Cn. In FIG. 1, for example, road sections $C_{31} \ldots C_{3n}$ of cluster C3 are represented with dashed lines, to thus indicate that the road sections contained therein are routed in one or more tunnels.

In accordance with an example embodiment of the present invention, it is provided that the pertinent data of the individual road sections acquired in each case using sensors be processed in its entirety in clusters C1 ... Cn. In this way, the computational effort for creating and providing the digital localization map may be very well scaled and parallelized.

Computing power of the various computers provided for this purpose may thereby be very well equalized and utilized in balanced fashion.

Preferably, the road sections are aggregated starting from so-called points of origin, until a certain defined volume of data is reached. For example, such points of origin may be crossroads, tunnels or other similar infrastructure elements.

FIG. 1 shows a total of three clusters C1, C2 and C3, road sections $C_{31} \ldots C_{3n}$ in cluster C3 being depicted by dashed lines. Cluster C1 represents a crossroad scenario, cluster C2 represents an entrance area onto a turnpike. All clusters C1, C2, C3 are shown only qualitatively, by way of example and not true to scale, and may, of course, also have more or fewer road sections $C_{11} \ldots C_{nn}$ than shown.

The approach in accordance with the present invention facilitates an efficient and balanced map-production process, resulting in high-quality localization maps. Balanced map production is thus ultimately facilitated, which leads to higher efficiency in the creation of the digital localization map.

Similar to the above-indicated convention approach B, the example method in accordance with the present inventions suggests an assignment of road sections in relevant areas in the form of clusters C1 ... Cn. In addition, however, qualitative parameters and complex critical scenarios are taken into account like, for example, crossroads, tunnels, etc., permitting them to be mapped consistently.

As a result, a data-driven clustering approach is thus realized for creating the digital localization map.

The provided approach is based on HAD mapping, with due regard to localization-relevant parameters such as road infrastructure (e.g., tunnels, critical road routings, crossroads, exits from turnpikes, etc.), connection quality and localization quality. As a result, anticipated probability values are assigned to road sections of a road network to be mapped. These probability parameters are used to classify the road sections.

Based on the classifications, clusters C1 ... Cn are formed, which determines the data that is processed together in creating the digital localization map. A balanced map production with complex scenarios relevant for the HAD map production is thereby made possible.

One advantage of the provided approach is the combining of a data-driven, classifying or categorizing approach, with a clustering process.

Efficient processing of a large volume of data as well as high map quality are very important for producing digital localization maps (HAD mapping, highly autonomous driving) on a large scale. The proposed approach allows scalable map production, resulting in high-quality maps.

The scaling may be achieved by grouping the road network to be mapped into individual road sections $C_{11} \ldots C_{nn}$ and the data-oriented processing of them in groups (clusters). High quality of the digital localization map may be achieved by combining the road sections based on a qualitative classification of them.

One advantage of such "soft clustering" (utilizing "soft" criteria) is that the process of producing the digital localization map permits good scalability, which is necessary for map production on a large scale. As a result, the digital localization map may be produced in a computationally balanced production procedure. Furthermore, the digital localization map produced in this way advantageously exhibits high quality, after relevant influences have been taken into account in the map production by the clustering.

In the following, the example process provided for creating and providing a feature-based digital localization map in accordance with an example embodiment of the present invention is explained in greater detail:

First, road sections $C_{11} \ldots C_{nn}$ are calculated along a road network relevant for the digital localization map. In this context, a road section $C_{11} \ldots C_{nn}$ represents an approximation of possible trajectories of vehicles which are on the road in the road section of the road network, a size of road section $C_{11} \ldots C_{nn}$ being configurable A first classification or categorization of road sections $C_{11} \ldots C_{nn}$ is carried out for an allocation of characteristics specific to the road network. These characteristics encode a complexity and a tendency toward a partitioning of road sections $C_{11} \ldots C_{nn}$. For example, a low number could be assigned to a road section $C_{11} \ldots C_{nn}$ which is dividable (e.g., because of an exceeded data limit), whereas a high number may be assigned to a road section $C_{11} \ldots C_{nn}$ which is out of the question for a division.

Generally, challenging scenarios for creating the digital localization map, such as tunnels, crossroads, exits from turnpikes, etc., receive a higher number, while country roads more likely receive a low number.

The second classification carried out is based on driving-environment sensor data acquired using sensors and provided by vehicles. In this case, availability and quality of the driving-environment sensor data are taken into account. For example, a road section $C_{11} \ldots C_{nn}$ on which GPS localization is hardly or not at all possible (as may be the case in tunnels, for example), may be assigned a high number. On the other hand, a road section for which high-quality driving-environment sensor data is available and for which a high localization quality is possible may be assigned a low number.

After the indicated classifications, road sections $C_{11} \ldots C_{nn}$ are combined utilizing a standard clustering approach, in which starting with a road section $C_{11} \ldots C_{nn}$ having the highest classification, adjacent road sections $C_{11} \ldots C_{nn}$ are then added or aggregated iteratively to form cluster $C1 \ldots Cn$, until a further separated road section $C_{11} \ldots C_{nn}$ has the highest classification, so that an additional cluster $C1 \ldots Cn$ is generated. The aim is for clusters to have data volumes that are as similar as possible, so that a computer load for calculating the digital localization map is equalized. Concrete numerical values cannot be indicated here, of course, and are dependent on a wide variety of parameters such as, e.g., number of available computers, size of the road network to be mapped, etc. Characteristic or similar scenarios thereby advantageously remain combined in one cluster, as it were, thus facilitating their processing.

By keeping track of the cluster sizes, it is thus possible "to run" mathematical algorithms for similar cluster sizes, the probability of a further road section being added to a cluster, notwithstanding "fulfilled size", being reduced.

Figure 2:
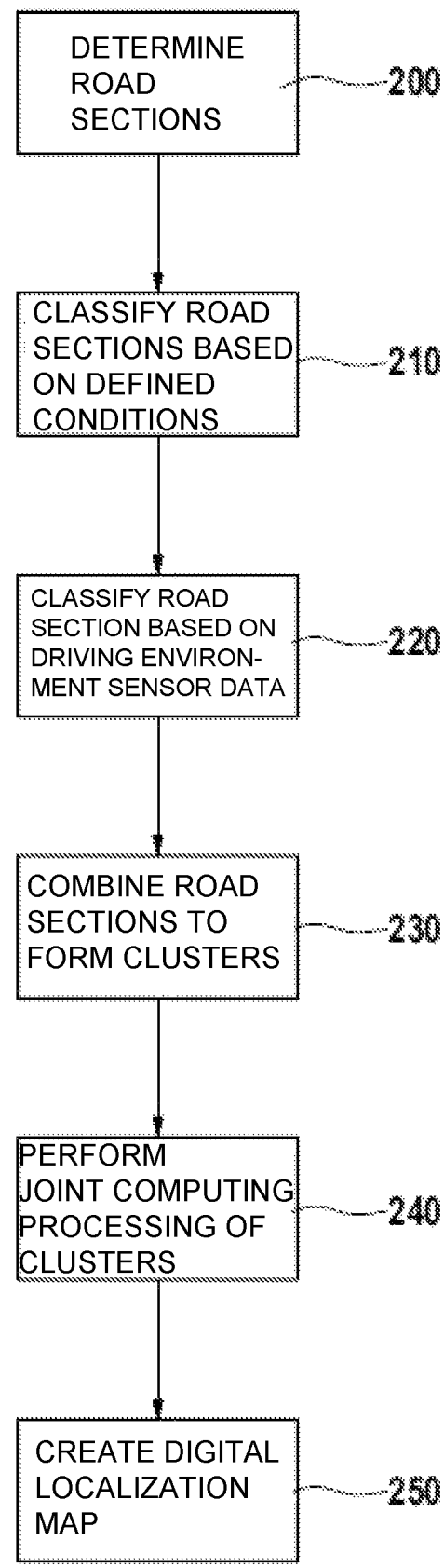
FIG. 2 shows a basic representation of a proposed method for providing a digital localization map for a vehicle in accordance with an example embodiment of the present invention.

FIG. 2 shows a high-level flow chart, with a representation of a method in accordance with an example embodiment of the present invention.

In a step 200, road sections $C_{11} \ldots C_{nn}$ are determined by evaluating data of a road network 100 to be mapped.

In a step 210, road sections $C_{11} \ldots C_{nn}$ are classified, taking defined conditions of road network 100 into account.

In a step 220, road sections $C_{11} \ldots C_{nn}$ are classified, taking driving-environment sensor data into account.

In a step 230, road sections $C_{11} \ldots C_{nn}$ are combined to form clusters $C1 \ldots Cn$, taking the classifications carried out in steps b) and c) into account.

In a step 240, in each case joint computational processing of clusters $C1 \ldots Cn$ is carried out.

Finally, in a step 250, the digital localization map created is transmitted to a vehicle.

The map-production device for creating the digital localization map is preferably a server device in the cloud, on which the proposed method runs as software. Easy adaptability of the method is thereby facilitated. Preferably, the respective clusters are adapted in terms of the amount of data to the computing power of the individual computers of the map-production device, thus promoting a balanced usage of the computer infrastructure for creating the digital localization map.

In implementing the present invention, one skilled in the art will also realize specific embodiments not specifically explained above.

What is claimed is:

1. A method for providing a digital localization map, the method comprising:
   a) determining road sections by evaluating data of a road network to be mapped;
   b) classifying the road sections, taking defined conditions of the road network into account;
   c) classifying the road sections, taking driving-environment sensor data into account;
   d) combining the road sections to form clusters, taking the classifications carried out in steps b) and c) into account;
   e) providing joint computational processing of each of the clusters to create the digital localization map; and
   f) transmitting the digital localization map created to a vehicle;
   wherein the digital localization map is a HAD (Highly Automated Driving) map,
   wherein a data volume of one or more of the clusters is adapted to a computing power of a map-production device,
   wherein the road sections are classified by assigning probability values to the road sections of the road network to be mapped, and wherein the probability values are used to classify the road sections,
   wherein each of the road sections represents an approximation of possible trajectories of the vehicles which are on the road in the road section of the road network,
   wherein the road sections are aggregated starting from points of origin, until a defined volume of data is reached, and wherein the points of origin include a crossroad, a tunnel, a road routing, an exit, and/or another infrastructure element,
   wherein in step d), the clusters are aggregated with the road sections until each of the clusters have a defined quantity of data to provide scalability in creating the digital localization map, and wherein upon reaching a defined size, a cluster is no longer further aggregated with other road sections, and
   wherein the clusters are made so that the amount of data is about the same in each, so as to provide parallelization for computational processing of the clusters.

2. The method as recited in claim 1, wherein in step d), each of the road sections is assigned to one of the clusters.

3. The method as recited in claim 1, wherein in step d), the clusters are aggregated so that they have approximately the same amount of data.

4. The method as recited in claim 1, wherein in step d), similar road sections of the road sections are combined to form each of the clusters.

5. The method as recited in claim 1, wherein defined numerical values are assigned to the road sections in steps b) and c).

6. The method as recited in claim 1, wherein features that are defined for defined road sections for the digital localization map and that were ascertained during the classifying of the road sections in steps b) and c), are usable in the vehicle.

7. An apparatus for providing a digital localization map, comprising:
   a device configured to perform the following:
      a) determining road sections by evaluating data of a road network to be mapped;
      b) classifying the road sections, taking defined conditions of the road network into account;
      c) classifying the road sections, taking driving-environment sensor data into account;

d) combining the road sections to form clusters, taking the classifications carried out in steps b) and c) into account;
e) providing joint computational process of each of the clusters to create the digital localization map; and
f) transmitting the digital localization map created to a vehicle;
wherein the digital localization map is a HAD (Highly Automated Driving) map,
wherein a data volume of one or more of the clusters is adapted to a computing power of a map-production device,
wherein the road sections are classified by assigning probability values to the road sections of the road network to be mapped, and wherein the probability values are used to classify the road sections,
wherein each of the road sections represents an approximation of possible trajectories of the vehicles which are on the road in the road section of the road network,
wherein the road sections are aggregated starting from points of origin, until a defined volume of data is reached, and wherein the points of origin include a crossroad, a tunnel, a road routing, an exit, and/or another infrastructure element,
wherein in step d), the clusters are aggregated with the road sections until each of the clusters have a defined quantity of data to provide scalability in creating the digital localization map, and wherein upon reaching a defined size, a cluster is no longer further aggregated with other road sections, and
wherein the clusters are made so that the amount of data is about the same in each, so as to provide parallelization for computational processing of the clusters.

8. A non-transitory machine-readable storage medium, on which is stored a computer program, comprising:
a program code arrangement having program code for providing a digital localization map by performing the following:
a) determining road sections by evaluating data of a road network to be mapped;
b) classifying the road sections, taking defined conditions of the road network into account;
c) classifying the road sections, taking driving-environment sensor data into account;
d) combining the road sections to form clusters, taking the classifications carried out in steps b) and c) into account;
e) providing joint computational processing of each of the clusters to create the digital localization map; and
f) transmitting the digital localization map created to a vehicle;
wherein the digital localization map is a HAD (Highly Automated Driving) map,
wherein a data volume of one or more of the clusters is adapted to a computing power of a map-production device,
wherein the road sections are classified by assigning probability values to the road sections of the road network to be mapped, and wherein the probability values are used to classify the road sections,
wherein each of the road sections represents an approximation of possible trajectories of the vehicles which are on the road in the road section of the road network,
wherein the road sections are aggregated starting from points of origin, until a defined volume of data is reached, and wherein the points of origin include a crossroad, a tunnel, a road routing, an exit, and/or another infrastructure element,
wherein in step d), the clusters are aggregated with the road sections until each of the clusters have a defined quantity of data to provide scalability in creating the digital localization map, and wherein upon reaching a defined size, a cluster is no longer further aggregated with other road sections, and
wherein the clusters are made so that the amount of data is about the same in each, so as to provide parallelization for computational processing of the clusters.

* * * * *